(12) United States Patent
O'Bannon

(10) Patent No.: US 6,206,703 B1
(45) Date of Patent: Mar. 27, 2001

(54) BIOFIDELIC HUMAN SEATING SURROGATE APPARATUS

(75) Inventor: Terry R. O'Bannon, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/260,620

(22) Filed: Mar. 1, 1999

(51) Int. Cl.[7] ................................................. G09B 23/28
(52) U.S. Cl. ........................... 434/274; 434/267; 446/373
(58) Field of Search .................................. 434/267, 274, 434/275, 262; 446/373

(56) References Cited

U.S. PATENT DOCUMENTS

| 983,547 | * | 2/1911 | Fleck . |
|---|---|---|---|
| 1,882,575 | * | 10/1932 | Hanks . |
| 2,472,819 | * | 6/1949 | Giesen . |
| 2,988,823 | * | 6/1961 | Rosenbloom . |
| 2,995,833 | * | 8/1961 | Bezark . |
| 3,501,777 | * | 3/1970 | Degtyarev et al. . |
| 3,592,041 | * | 7/1971 | Spencer . |
| 4,451,416 | | 5/1998 | Burtscher . |
| 4,773,865 | | 9/1988 | Baldwin . |
| 5,018,977 | | 5/1991 | Wiley, et al. . |
| 5,116,381 | * | 5/1992 | Palfray . |
| 5,336,270 | * | 8/1994 | Lloyd . |
| 5,376,127 | * | 12/1994 | Swanson . |
| 5,379,646 | * | 1/1995 | Andrzejak et al. . |
| 5,465,605 | * | 11/1995 | Smith et al. . |
| 5,480,341 | * | 1/1996 | Plakos ................................... 446/373 |
| 5,526,707 | * | 6/1996 | Smrcka . |
| 5,628,230 | | 5/1997 | Flam . |
| 5,703,303 | * | 12/1997 | Stewart . |

\* cited by examiner

Primary Examiner—Sam Rimell
Assistant Examiner—Bena B. Miller
(74) Attorney, Agent, or Firm—Brooks & Kushman P.C.

(57) ABSTRACT

A biofidelic human seating surrogate apparatus adapted to sit on and be supported by a vehicle seat to simulate human loading of the vehicle seat is disclosed. The apparatus includes a substantially geometrically-correct, relatively hard and relatively stiff skeletal frame structure having a substantially correct density. The structure, in turn, includes: a thoracic cage, a pair of scapulae connected at opposite sides of the thoracic cage, a set of lumbar vertebrae connected to the thoracic cage, a pelvic girdle connected to the lumbar vertebrae, a coccyx connected to the pelvic girdle, a pair of femurs, and a first pair of ball-and-socket joints for connecting their respective femurs to the pelvic girdle. The structure further includes elastomeric plastic formed over the skeletal frame structure. The elastomeric plastic has a substantially anatomically-correct, surface geometry and a substantially correct density. At least the elastomeric plastic formed over the pelvic girdle, the coccyx and the pair of femurs has mechanical properties of bulk muscular tissue in a state of moderate contraction.

19 Claims, 1 Drawing Sheet

BIOFIDELIC HUMAN SEATING SURROGATE APPARATUS

CROSS-REFERENCE TO RELATED APPLICATIONS

This application is related to U.S. patent applications filed on the same date as this application and entitled: "Vibration Dummy Apparatus" and "Method And System For Wear Testing A Seat By Simulating Human Seating Activity And Robotic Human Body Simulator For Use Therein."

TECHNICAL FIELD

This invention relates to biofidelic human seating surrogate apparatus and, in particular, for biofidelic human seating surrogate apparatus which simulate human loading on vehicle seats.

BACKGROUND ART

It is desirable to simulate the load distributions and histories experienced by automotive seats in field use. In carrying out this need, it is important to improve the predictive power of automotive seat durability testing by making it more representative of actual field use or more life-like.

U.S. Pat. No. 5,336,270 discloses a plastic material formed over inner components.

U.S. Pat. No. 3,501,777 discloses a urethane foam disposed over a simulated skeleton.

U.S. Pat. No. 5,376,127 discloses polyethylene sheet material surrounding a endoskeleton.

U.S. Pat. No. 5,116,381 discloses a lower leg cast of thermoplastic material.

U.S. Pat. No. 5,526,707 discloses a simulated pregnant crash tested dummy.

U.S. Pat. No. 5,703,303 discloses a simulated torso for testing seats, with the torso being mounted on a boom.

U.S. Pat. No. 5,465,605 discloses a carpet wear testing machine that rolls a simulated heel over the carpet.

U.S. Pat. No. 3,592,041 discloses chair/seat testing by hydraulically controlled back and seat simulators.

U.S. Pat. No. 5,379,646 discloses a test dummy with "back-specific" pressure units for testing vehicle seat backs.

DISCLOSURE OF INVENTION

An object of the present invention is to provide a biofidelic human seating surrogate apparatus capable of simulating human loading by duplicating the geometry and load distribution of a human at an interface with the vehicle seat to be tested.

In carrying out the above object and other objects of the present invention, a biofidelic human seating surrogate apparatus adapted to sit on and be supported by a vehicle seat to simulate human loading of the vehicle seat is provided. The apparatus includes a substantially geometrically-correct, relatively hard and relatively stiff skeletal frame structure having a substantially correct density. The structure, in turn, includes: a thoracic cage, a pair of scapulae connected at opposite sides of the thoracic cage, a set of lumbar vertebrae connected to the thoracic cage, a pelvic girdle connected to the lumbar vertebrae, a coccyx connected to the pelvic girdle, a pair of femurs, and a pair of ball-and-socket joints for connecting their respective femurs to the pelvic girdle. The apparatus also includes elastomeric plastic formed over the skeletal frame structure. The elastomeric plastic has a substantially anatomically-correct, surface geometry and a substantially correct density. At least the elastomeric plastic formed over the pelvic girdle, the coccyx and the pair of femurs has mechanical properties of bulk muscular tissue in a state of moderate contraction.

The thoracic cage includes a set of thoracic vertebrae, a sternum and a set of ribs interconnecting the thoracic vertebrae and the sternum.

The pelvic girdle includes a set of sacrum vertebrae and a pair of coxae connected to the set of sacrum vertebrae wherein the pair of ball-and-socket joints connect their respective femurs to their respective coxae.

The plastic formed over the pelvic girdle, the coccyx and the pair of femurs has an effective stiffness in a range of 6 to 140 kPa.

The elastomeric plastic may be a castable urethane elastomer molded over the skeletal frame structure.

Preferably, the mechanical properties include stiffness, inertia, and damping.

Also, preferably, the elastomeric plastic is completely formed over the skeletal frame structure and at least a part of the skeletal frame structure is made from plastic.

Preferably, the skeletal frame structure includes a skull and a set of cervical vertebrae for connecting the skull to the thoracic cage.

Also, preferably, the skeletal frame structure includes a pair of humeri connected at opposite sides of the thoracic cage by a pectoral girdle. A second pair of ball-and-socket joints connect their respective humeri to the thoracic cage. The pectoral girdle includes the pair of scapulae and a pair of clavicles connected to their respective scapulas.

Preferably, the skeletal frame structure includes a pair of forearms connected to their respective humeri and each of the forearms includes a radius and an ulna hingedly connected to its respective humerus.

Also, preferably, the skeletal frame structure includes a pair of legs connected to their respective femurs and each of the legs includes a fibula and a tibia hingedly connected to its respective femur.

Still further in carrying out the above object and other objects of the present invention, a biofidelic human seating surrogate apparatus adapted to sit on and be supported by a vehicle seat to simulate human loading of the vehicle seat is provided. The apparatus includes a substantially geometrically-correct, relatively hard and relatively stiff skeletal frame structure having a substantially correct density. The structure, in turn, includes a skull, a set of cervical vertebrae connected to the skull, a thoracic cage connected to the set of cervical vertebrae, a pair of scapulae connected at opposite sides of the thoracic cage, a pair of humeri connected at opposite sides of the thoracic cage, a pair of forearms connected to the respective humeri, a set of lumbar vertebrae connected to the thoracic cage, a pelvic girdle connected to the lumbar vertebrae, a coccyx connected to the pelvic girdle, a pair of femurs, a first pair of ball-and-socket joints for connecting their respective femurs to the pelvic girdle, and a pair of legs connected to their respective femurs. The apparatus further includes elastomeric plastic formed over the skeletal frame structure. The elastomeric plastic has a substantially anatomically-correct, surface geometry and a substantially correct density. At least the elastomeric plastic formed over the pelvic girdle, the coccyx and the pair of femurs has mechanical properties of bulk muscular tissue in a state of moderate contraction.

The apparatus of the invention allows physical simulation of a human's load distribution on a vehicle seat. The apparatus re-creates all "hard" points and resultant pressure distributions according to previously validated statistics. The apparatus specifically mimics human bone and flesh interacting with deformable surfaces, which has not been accomplished previously. The apparatus of the invention may be made by placing a geometrically-correct skeleton into a seamless, geometrically-correct mold. The mold is filled with a plastic whose material and mechanical properties match those of average human soft tissue. The apparatus has applications in durability, vibration, safety, and comfort testing of vehicle seats.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
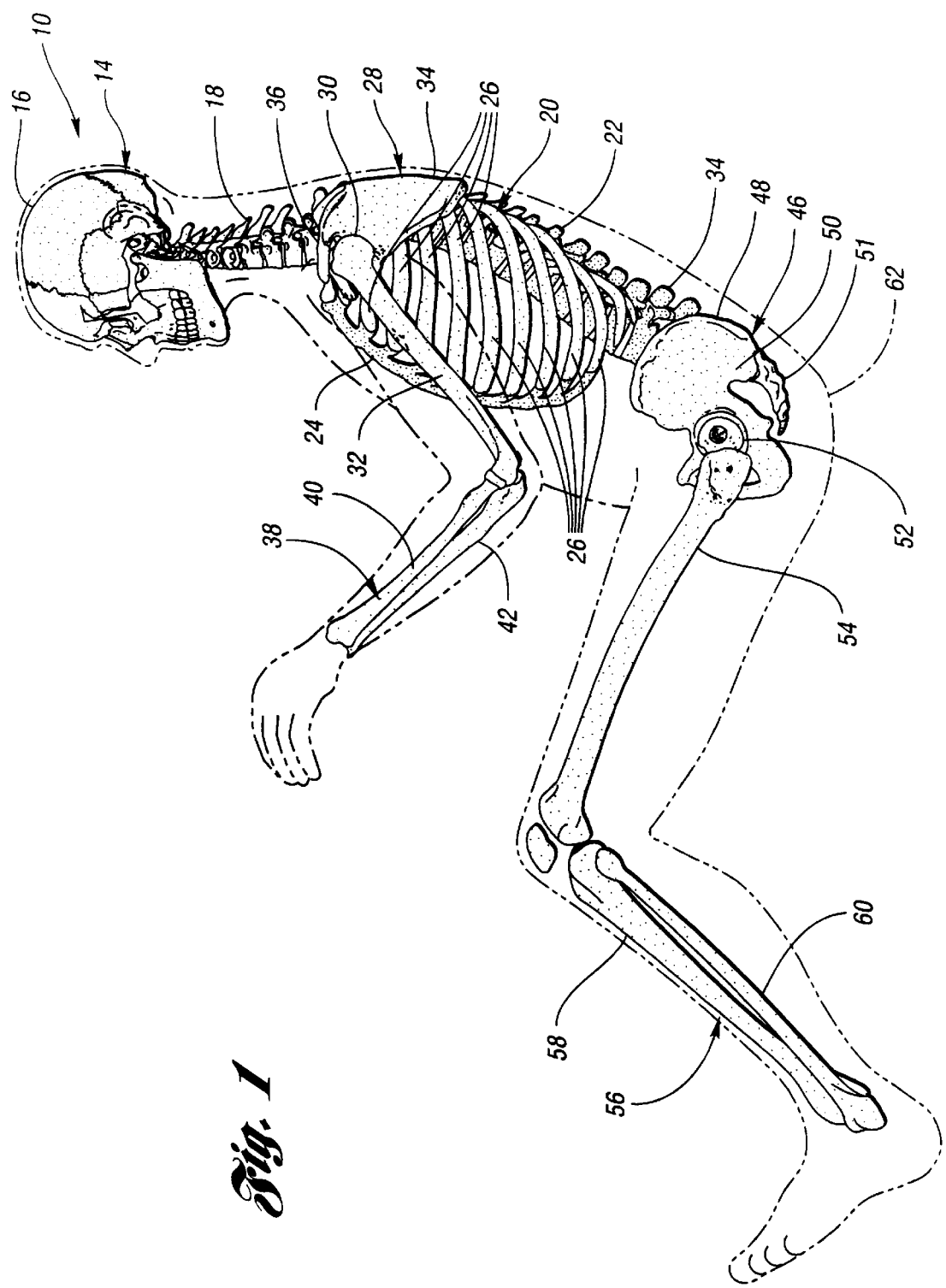
FIG. 1 is a side schematic view of a biofidelic human seating surrogate apparatus constructed in accordance with the present invention.

Referring now to FIG. 1, there is illustrated a biofidelic human seating surrogate apparatus, generally indicated at 10. The apparatus 10 is adapted to sit on and be supported by a vehicle seat (not shown) to simulate human loading of the vehicle seat.

The apparatus 10 includes a substantially geometrically-correct, relatively hard and relatively stiff skeletal frame structure, generally indicated at 14, having a substantially correct density. The structure may be made from plastic, metal, or any other relatively hard and stiff substance. The structure 14 includes a skull 16, a set of cervical vertebrae 18 connected to the skull 16, and a thoracic cage, generally indicated at 20, connected to the set of cervical vertebrae 18.

The thoracic cage 20 includes a set of thoracic vertebrae 22, a sternum 24, and a set of ribs 26 interconnecting the thoracic vertebrae 22 and the sternum 24.

The structure 14 also includes a pectoral girdle, generally indicated at 28, and a pair of ball-and-socket joints 30 (only one shown) for connecting humeri 32 (only one shown) at opposite sides of the thoracic cage 20. The pectoral girdle 28 includes a pair of scapulae 34 (only one shown) connected at opposite sides of the thoracic cage 20 and a pair of clavicles 36 (only one shown) connected to their respective scapulae 34.

A pair of forearms, generally indicated at 38, are connected to their respective humeri 32. Each of the forearms 38 includes a radius 40 and an ulna 42 hingedly connected to its respective humerus 32.

A set of lumbar vertebrae 44 interconnect the thoracic cage 20 to a pelvic girdle, generally indicated at 46. The pelvic girdle 46 includes a set of sacrum vertebrae 48 and a pair of coxae 50 connected to the set of sacrum vertebrae 48. A coccyx 51 is connected to the pelvic girdle 46. A pair of ball-and-socket joints 52 (only one shown) connect femurs 54 to their respective coxae 50. A pair of legs 56 are connected to their respective femurs 54. In turn, each of the legs 56 include a tibia 58 and a fibula 60. Each of the tibiae 58 is hingedly connected to its respective femur 54.

Elastomeric plastic 62 is formed over the skeletal frame structure 14. The elastomeric plastic 62 has a substantially anatomically-correct, surface geometry and a substantially correct density. At least the elastomeric plastic 62 formed over the pelvic girdle 46, the coccyx 51 and the pair of femurs 54 has mechanical properties of bulk muscular tissue in a state of moderate contraction. The mechanical properties include stiffness, inertia, and damping.

The plastic 62 formed over the pelvic girdle 46, the coccyx 51, and the pair of femurs 54 has an effective stiffness in a range of 6 to 140 kPa. The elastomeric plastic 62 may be castable urethane elastomer molded over the skeletal frame structure 14.

The castable urethane elastomer may be an elastomer known as "Skinflex III". The plastic 62 is made from Skinflex III components by mixing 300 grams of Skinflex III Part "A" into 600 grams of Skinflex Part "B" and then mixing in approximately 1200 grams of Skinflex III Part "C" which is a plasticizer. These components are available from Chembar, Inc. of Groveport, Ohio.

A modified version of the apparatus 10 may include a molded five-piece skeleton with correct geometry for the pelvis, femurs, lumbar vertebrae section, and thoracic section which includes vertebrae, ribs, and a shoulder structure. The geometry may be based on a digitized skeleton modified to accept the necessary joint hardware. The skeleton may be molded in a rigid plastic whose hardness and stiffness are sufficiently greater than that of the surrounding "flesh" to mimic bone hardness and stiffness.

The body contours of the plastic may be taken from the ASPECT project and integrated into a seamless one-piece plastic mold.

The simulated flesh behaves like human bulk tissue during muscle activation, particularly in the thigh and buttocks area.

The soft lower extremity tissue (i.e. plastic) has a effective stiffness somewhere in the range of 6 to 140 kPa. The term "effective stiffness" is used because real soft tissue is highly non-linear, with a stiffness exhibiting both load and load rate dependence.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A biofidelic human seating surrogate apparatus adapted to sit on and be supported by a vehicle seat to simulate human loading of the vehicle seat, the apparatus comprising:

a substantially geometrically-correct, relatively hard and relatively stiff skeletal frame structure having a substantially correct density, the skeletal frame structure including:

a thoracic cage; a pair of scapulae connected at opposite sides of the thoracic cage; a set of lumbar vertebrae connected to the thoracic cage; a pelvic girdle connected to the lumbar vertebrae; a coccyx connected to the pelvic girdle; a pair of femurs; and a first pair of ball-and-socket joints for connecting their respective femurs to the pelvic girdle; and elastomeric plastic formed over the skeletal frame structure, the elastomeric plastic having a substantially anatomically-correct, surface geometry and a substantially correct density wherein at least the elastomeric plastic formed over the pelvic girdle, the coccyx and the pair of femurs has mechanical properties of bulk muscular tissue in a state of moderate contraction, wherein the plastic formed over the pelvic girdle, the coccyx and the pair of femurs has an effective stiffness in a range of 6 to 140 kPa.

2. The apparatus as claimed in claim 1 wherein the thoracic cage includes a set of thoracic vertebrae, a sternum and a set of ribs interconnecting the thoracic vertebrae and the sternum.

3. The apparatus as claimed in claim 1 wherein the pelvic girdle includes a set of sacrum vertebrae and a pair of coxae connected to the set of sacrum vertebrae wherein the first pair of ball-and-socket joints connect their respective femurs to their respective coxae.

4. The apparatus as claimed in claim 1 wherein the elastomeric plastic is a castable urethane elastomer molded over the skeletal frame structure.

5. The apparatus as claimed in claim 1 wherein the mechanical properties include stiffness.

6. The apparatus as claimed in claim 5 wherein the mechanical properties include inertia.

7. The apparatus as claimed in claim 6 wherein the mechanical properties include damping.

8. The apparatus as claimed in claim 1 wherein the elastomeric plastic is completely formed over the skeletal frame structure.

9. The apparatus as claimed in claim 1 wherein at least a part of the skeletal frame structure is made from plastic.

10. The apparatus as claimed in claim 1 wherein the skeletal frame structure includes a skull connected to the thoracic cage.

11. The apparatus as claimed in claim 10 wherein the skeletal frame structure includes a set of cervical vertebrae for connecting the skull to the thoracic cage.

12. The apparatus as claimed in claim 1 wherein the skeletal frame structure includes a pair of humeri connected at opposite sides of the thoracic cage.

13. The apparatus as claimed in claim 12 further comprising a pectoral girdle and a second pair of ball-and-socket joints for connecting their respective humeri to the thoracic cage.

14. The apparatus as claimed in claim 13 wherein the pectoral girdle includes the pair of scapulae and a pair of clavicles connected to their respective scapulas.

15. The apparatus as claimed in claim 12 wherein the skeletal frame structure includes a pair of forearms connected to their respective humeri.

16. The apparatus as claimed in claim 15 wherein each of the forearms includes a radius and an ulna hingedly connected to its respective humerus.

17. The apparatus as claimed in claim 1 wherein the skeletal frame structure includes a pair of legs connected to their restive femurs.

18. The apparatus as claimed in claim 17 wherein each of the legs includes a fibula and a tibia hingedly connected to its respective femur.

19. A biofidelic human seating surrogate apparatus adapted to sit on and be supported by a vehicle seat to simulate human loading of the vehicle seat, the apparatus comprising:

a substantially geometrically-correct, relatively hard and relatively stiff skeletal frame structure having a substantially correct density, the skeletal frame structure including:

a skull; a set of cervical vertebrae connected to the skull; a thoracic cage connected to the set of cervical vertebrae; a pair of scapulae connected at opposite sides of the thoracic cage; a pair of humeri connected at opposite sides of the thoracic cage; a pair of forearms connected to the respective humeri; a set of lumbar vertebrae connected to the thoracic cage; a pelvic girdle connected to the lumbar vertebrae; a coccyx connected to the pelvic girdle; a pair of femurs; a first pair of ball-and-socket joints for connecting their respective femurs to the pelvic girdle; and a pair of legs connected to their respective femurs; and elastomeric plastic formed over the skeletal frame structure, the elastomeric plastic having a substantially anatomically-correct, surface geometry, and a substantially correct density wherein at least the elastomeric plastic formed over the pelvic girdle, the coccyx and the pair of femurs has mechanical properties of bulk muscular tissue in a state of moderate contraction, wherein the plastic formed over the pelvic girdle, the coccyx and the pair of femurs has an effective stiffness in a range of 6 to 140 kPa.

* * * * *

UNITED STATES PATENT AND TRADEMARK OFFICE
CERTIFICATE OF CORRECTION

PATENT NO. : 6,206,703 B1
DATED : March 27, 2001
INVENTOR(S) : Terry R. O'Bannon It is certified that error appears in the above-identified patent and that said Letters Patent is hereby corrected as shown below:

Column 6,
Line 9, claim 17: Delete "restive" and insert -- respective --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*